US012505104B2

(12) United States Patent
Al-Shehab et al.

(10) Patent No.: US 12,505,104 B2
(45) Date of Patent: Dec. 23, 2025

(54) COMPUTER-BASED SYSTEMS CONFIGURED FOR NOVEL INFORMATION PROCESSING AND STORAGE UTILIZING ELASTIC SEARCH ENVIRONMENT OF A LOCAL CACHE AND METHOD AND USE THEREOF

(71) Applicant: Capital One Services, LLC, McLean, VA (US)

(72) Inventors: Ali S. Al-Shehab, Medford, MA (US); Jr-Wei Jeng, Marlboro, NJ (US); Niti N. Sheth, Edison, NJ (US); Tanveer Afzal Faruquie, Scarsdale, NY (US); David Edward Lutz, Tarrytown, NY (US); Nathan L Sheridan, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/602,828

(22) Filed: Mar. 12, 2024

(65) Prior Publication Data

US 2025/0291797 A1   Sep. 18, 2025

(51) Int. Cl.
*G06F 16/00* (2019.01)
*G06F 16/215* (2019.01)
*G06F 16/2455* (2019.01)

(52) U.S. Cl.
CPC ...... *G06F 16/24552* (2019.01); *G06F 16/215* (2019.01)

(58) Field of Classification Search
None
See application file for complete search history.

(56) References Cited

U.S. PATENT DOCUMENTS

| 9,838,410 B2 | 12/2017 | Muddu et al. |
| 11,314,874 B2 | 4/2022 | Dande et al. |
| 2021/0224258 A1* | 7/2021 | Faruquie ............... G06F 16/244 |

\* cited by examiner

*Primary Examiner* — Bai D Vu
(74) *Attorney, Agent, or Firm* — Greenberg Traurig, LLP

(57) ABSTRACT

In order to facilitate entity resolution, systems and methods include a processor receiving entity records associated with one or more entities, the system leverages information processing techniques that include utilizing a first sector of a local cache memory to store verified entity records, and store an unverified non-exact match in a second sector of a local cache memory linking the verified and unverified entity records for real-time entity record resolution, the system and methods further order the unverified records to enhance search and reduce reliance on third party systems for entity record verification thus reducing API calls to external vendors.

20 Claims, 5 Drawing Sheets

COMPUTER-BASED SYSTEMS CONFIGURED FOR NOVEL INFORMATION PROCESSING AND STORAGE UTILIZING ELASTIC SEARCH ENVIRONMENT OF A LOCAL CACHE AND METHOD AND USE THEREOF

FIELD OF TECHNOLOGY

The present disclosure generally relates to computer-based systems configured for one or more novel technological applications of entity resolution for efficient dataset reduction.

BACKGROUND OF TECHNOLOGY

A computer system may include a group of computers (e.g., clients, servers, smart routers) and other computing hardware devices that are linked together through one or more communication channels to facilitate communication and resource-sharing, specifically programmed to resolve entity records.

SUMMARY OF DESCRIBED SUBJECT MATTER

In some aspects, the techniques described herein relate to a computer-implemented method including: receiving, by at least one processor, a group of entity records, the group of entity records stored in an elastic search environment that is in communication with at least one local cache memory, the group of entity records including at least one data item associated with an entity, the group of entity records associated with at least one candidate entity record; utilizing, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one unverified candidate entity record in a second sector of a local cache memory and link to a verified entity record of a first sector based on a distance measure; and display the at least one merged entity record.

In some aspects, the techniques described herein relate to at least one non-transient computer-readable storage medium having encoded thereon software instructions that, when executed by at least one processor, cause the at least one processor to perform the steps to: receive, by at least one processor, a group of entity records, the group of entity records stored in an elastic search environment that is in communication with at least one local cache memory, the group of entity records including at least one data item associated with an entity, the group of entity records associated with at least one candidate entity record; utilize, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one unverified candidate entity record in a second sector of a local cache memory and link to a verified entity record of a first sector based on a distance measure; and display the at least one merged entity record.

In some aspects, the techniques described herein relate to a system including: a non-transient computer memory, storing software instructions; and at least one processor of a first computing devices associated with a user; where, then at least one processor executes the software instructions, the first computing device is programmed to: receive, by at least one processor, a group of entity records, the group of entity records stored in an elastic search environment that is in communication with at least one local cache memory, the group of entity records including at least one data item associated with an entity, the group of entity records associated with at least one candidate entity record; utilize, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one pre-cleansed candidate entity record in a second sector of a local cache memory and link to a verified entity record of a first sector based on a distance measure; and display the at least one merged entity record.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
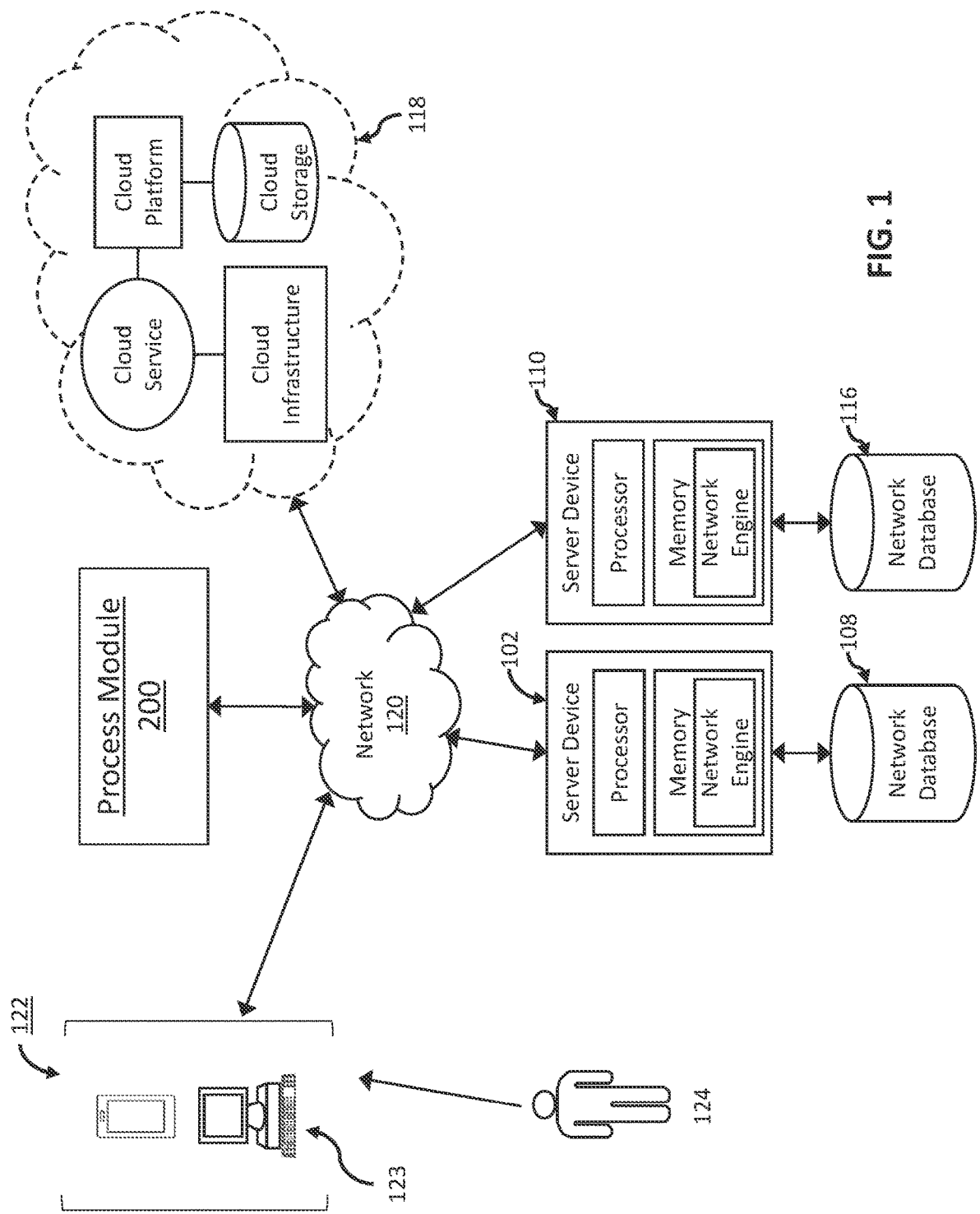
FIG. 1 is a block diagram of an illustrative computer-implemented system configured for utilizing a local cache memory for processing data records in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 5 illustrate systems and methods of database communication, data collection and processing, and flow charts of data collection and processing. The following embodiments provide technical solutions and technical improvements that overcome technical problems, drawbacks or deficiencies in the technical fields involving database inefficiencies, database interoperability, data accuracy and data portability, among others. As explained in more detail, below, technical solutions and technical improvements herein include aspects of improved data processing that utilize a local cache memory of a multi-function cluster of nodes that operate in conjunction with machine learning models to address technical challenges in entity resolution, database interoperability, information processing systems among others. Based on such technical features, further technical benefits become available to users and operators of these systems and methods. Moreover, various practical applications of the disclosed technology are also described, which provide further practical benefits to users and operators that are also new and useful improvements in the art.

Information processing in big data environments is a technical challenge especially when the data on which operations are to be performed, exceed a magnitude of $1\times(10^8)$. Large companies that have internal complex computer systems having tens of thousands of nodes, proprietary software and hundreds of computer engineers on staff often still rely on outside vendors to implement some operations related to information processing of big data. Relying on external vendors to carry out information processing is extremely costly and resource intensive (e.g., network bandwidth and memory use). Often the external vendor charges a fee on a per operational request basis. Thus, if possible, large companies may configure systems capable of handling all information processing requests internally. This disclosure contemplates a system that improves information processing in computer-implemented systems that utilizes novel information processing techniques, a local memory cache and a natural language processing machine learning model to refine data associated with entity record.

In some embodiments the system and methods leverage information processing techniques to reduce reliance on third party systems for entity record verification e.g., API calls to external vendors. Reliance on third party systems is costly, represents a security risk, use network bandwidth for the API calls, and is a time sink, among other issues. Additionally, requests for entity resolution of an entity may occur multiple times. This results in the same request being handled multiple times. Typically, once an entity record has been verified by an external vendor, the record of that verified entity record is removed.

Multiple requests to verify the same entity record to a third party vendor is unnecessary, as the entity record had been previously verified by the external vendor. Currently no (process efficient) system for determining whether the record had been previously verified in real-time exists.

In some embodiments the system and methods utilize a first sector of a local cache memory to store a verified entity record. Upon receipt of an entity record to resolve, the system checks to see if a match exists in the first sector of the local cache memory. If a match does not exist, the system sends a request to the external vendor API for resolution.

Once the entity record has been verified, the verified entity record is stored in a first sector of the local cache memory, and the unverified entity record is stored in a second sector of a local cache memory. The unverified entity record is rarely an exact match of the verified entity record, but it is very unlikely to share zero similarity. Thus, the unverified entity record inherently has informative value to the information processing entity resolution system. The system and methods utilize novel techniques in data handling, data structure and linkage of data structures to link unverified entity records in a second sector of a local cache memory to a verified entity record in the first sector. The system and methods reduce costs by reducing external vendor API calls for entity record resolution, e.g., reduce processing time of an entity record, reduces processing of the same entity record multiple times unnecessarily, reduces entity search processing time by several orders of magnitude by reducing and/or eliminating the need to search for a match of an entity record in a local storage database.

FIG. 1 depicts a block diagram of an illustrative computer-implemented system configured for processing entity records in accordance with one or more embodiments of the present disclosure.

In some embodiments the exemplary system as depicted in FIG. 1 may be configured to resolve entity records independently as a process module 200. In some embodiments the exemplary system for processing entity records having the illustrative process module 200 may be configured to resolve entity records communicatively coupled to a group and/or a cluster of computers such as for example, the illustrative system may be configured to operate in a network 120, the information processing system utilizing a virtual local cache memory e.g., L1, L2, L3, DRAM, of a virtual machine to reduce reliance on third party vendors e.g., external vendor API calls.

In some embodiments the exemplary system for processing entity records may operate in a server device 102 communicatively coupled to a network database 108, or a server device 110 communicatively coupled to a network database 116, the system utilizing a local cache memory of a processor e.g., L1, L2, L3, DRAM, and/or a memory of server device 102 and/or server device 110. In some embodiments the exemplary system for resolving entity records utilizing the novel information processing techniques with the local cache memory of a processor e.g., L1, L2, L3, DRAM of a server device 102 and/or server device 110 may process an entity record orders of magnitude faster than a typical entity record resolution system. In some embodiments the exemplary system for resolving entity records may be configured to operate on a mobile computing device 122, the system utilizing a local cache memory of a processor of the mobile computing device 122. In some embodiments the exemplary system for resolving entity records may be configured to operate on a personal computing device 123 the information processing system utilizing a local cache memory of the personal computing device 123. In some embodiments the exemplary system for resolving entity records may be configured to operate independently or in conjunction with any of a personal computing device 123, a mobile computing device 122, a network 120, a server device 102 communicatively coupled to a network database 108, a server device 110 communicatively coupled to a network database 116, a cloud platform 118, a process module 200 or any other similar type of computing system accessible to a user 124.

In some embodiments, referring to FIG. 1, of the exemplary computer-implemented system and platform may include virtually any computing device capable of receiving and sending a message over a network (e.g., cloud network), such as network 120, to and from another computing device, such as server device 102 and server device 110, each other, and the like. In some embodiments, the exemplary system and methods may be personal computers, multiprocessor systems, microprocessor-based or programmable consumer electronics, network PCs, and the like. In some embodiments, one or more client devices within a computing device(s) of FIG. 1 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device 122, and the like. In some embodiments, one or more client devices within computing device(s) of FIG. 1 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within computing device(s) of FIG. 1 may include and may run one or more applications, such as Internet browsers, mobile applications, voice calls, video games, videoconferencing, and email, among others. In some embodiments, one or more client devices within computing device(s) of FIG. 1 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within computing device(s) of FIG. 1 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within computing device(s) of FIG. 1 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

Figure 2:
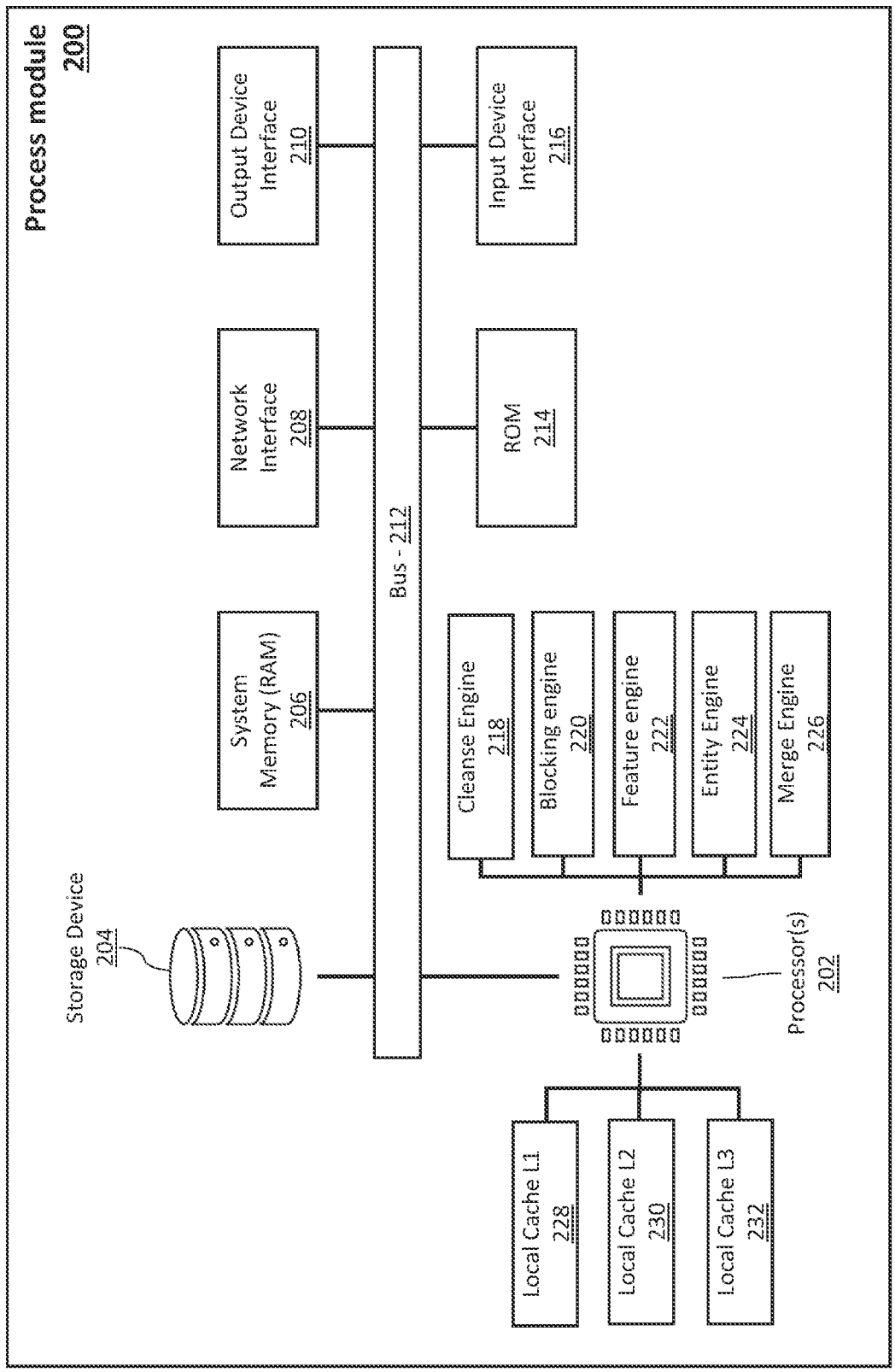
FIG. 2 depicts a block diagram of an exemplary computer-implemented process module utilizing a local cache memory for resolving of a group of entity records in accordance with one or more embodiments of the present disclosure.

FIG. 2 depicts a block diagram of an illustrative computer-implemented system configured for processing entity records in accordance with one or more embodiments of the present disclosure.

In some embodiments the exemplary system and method to resolve entity records may be configured to operate on an illustrative process module 200 as depicted in FIG. 2. In some embodiments the illustrative process module 200 may be configured as an independent computing device having a communication bus 212 communicatively coupling computing components. In some embodiments the communication bus 212 of the illustrative process module 200 may be communicatively coupled to at least one of a processor(s) 202, a storage device 204, a system memory (RAM) or DRAM, a network interface 208, an output device interface 210, a ROM 214, an input device interface 216, at least one cleanse engine 218, at least one blocking engine 220, at least one feature engine 222, at least one entity engine 224, at least one merge engine 226, a local cache L1 228, a local cache L2 230, a local cache L3 232, and/or any similar type of computing component capable of carrying out the novel information processing techniques of the disclosure. In some embodiments the illustrative process module 200 having at least one network interface 208 communicatively coupled to a communication bus 212 is capable of transmitting data related to resolving entity records. The illustrative process module 200 may receive instructions from a user 124, input through an input device interface 216, e.g., keyboard, mouse, etc., the user 124 may view information pertaining to the entity resolution system on an output device interface 210, e.g., monitor, printer, etc.

In some embodiments for the purposes of this disclosure the use of the terminology of a local cache memory may refer to the local cache L1 228, the local cache L2 230, the local cache L3 232 of the at least one processor(s) 202 of the illustrative process module 200. In some embodiments the local cache memory may be configured with at least a first sector and a second sector, the data structure of each sector of the local cache memory may be a list, a table, a stack, a queue, a binary search tree, a linked list, a binary tree, an expression trees type, an array, a tree, a hash table, or any similar type of data structure or any combination thereof that efficiently encodes an entity record. In some embodiments the data structure of the local cache memory may be configured to contain any number of representations of an entity record data type including a string of text, text characters, numeric representations, a vector, a hash function, a key, of for example a business name "Midtown Computer Repair", a phone number "808-345-6543" a zip code "32401", a credit score "606", an owner's name "Jim Brown", or any similar type of information about an entity or any combination thereof. In some embodiments the data of the entity record may be a partial representation of the entity record data such as a trigram of a zip code "324" or an area code of a phone number "808" or any similar partial representation of entity record data. In some embodiments the at least one cleanse engine 218 of the illustrative process module 200 may utilize the at least on processor(s) 202 to convert the at least one unverified candidate entity record into at least one vector of integers such as for example "84398". The at least one cleanse engine 218 may be configured to then search for an exact match of the unverified vector for a verified vector in a first sector of a local cache memory, for example local cache L1 228. In some embodiments, in the case where a match of the unverified entity record in the first sector of a local cache memory is absent, the at least one cleanse engine 218 of the illustrative process module 200 may send the unverified entity record to a third party e.g., external vendor API to be verified. In some embodiments the at least one cleanse engine 218 of the illustrative process module 200 may receive the verified entity record from the third party, and store the verified entity record in the first sector of the local cache L1 228 for later recall and/or lookup to match with an entity record to be resolved. In some embodiments, in the case where an entity record is received by the at least one cleanse engine 218, the at least one cleanse engine 218 may determine that the entity record is a match with the verified entity record stored in a first sector of the local cache L1 228 of the illustrative process module 200, and not send the entity record to the third party to be verified a second time thus reducing processing of the entity record, bandwidth of data transmission, and further processing by the at least one blocking engine 220, the at least one feature engine 222, the at least one entity engine 224, the at least one merge engine 226 and/or any similar components of the illustrative process module 200.

In some embodiments the at least one cleanse engine 218 of the illustrative process module 200 may be configured to cleanse a group of entity records received by the at least one processor(s) 202. In some embodiments the at least one cleanse engine 218 may utilize a rule-based detection to, e.g., detect that entity records associated with known entities are captured correctly. Additionally, the at least one cleanse engine 218 removes anomalous and unnecessary information to provide a uniform format of the data of each record e.g., pad or remove portions of an entity record and/or convert to a numeric representation such as a vector, ID representation or the like. In some embodiments the at least one cleanse engine 218 may deduplicate entity records that are determined to exactly match among the group of entity records. In some embodiments the at least one cleanse engine 218 may utilize a search e.g., heuristic search to determine exact matches among a group of entity records for determining duplicate entity records and/or may utilize fuzzy search methods for determining duplicate entity records.

In some embodiments the illustrative process module 200 may utilize the at least one cleanse engine 218 to determine if the presence of a verified entity record that matches the at least one entity record in a first sector of a local cache L1 228, and/or a local cache L2 230, and/or a local cache L3 232 of the at least one processor(s) 202. In some embodiments the at least one cleanse engine 218 may utilize other memory systems of the illustrative process module 200 for example the at least one cleanse engine 218 may determine if a match of a verified entity record exists in a first sector of a system memory (RAM) 206 and/or a DRAM of the system. In some embodiments the at least one cleanse engine 218 of the illustrative process module 200 may determine an absence of a match of the at least one entity record in a first sector of a local cache L1 228, and/or a local cache L2 230, and/or a local cache L3 232 e.g., local cache of the at least one processor(s) 202. In the case where the at least one cleanse engine 218 determines an absence of a match of the at least one entity record in a first sector of the local cache, the illustrative process module 200 may send via the network interface 208 the at least one entity record to a third party e.g., external vendor API, to be verified by the third party.

In some embodiments the illustrative process module 200 may receive at least one entity record for resolution that is not 100% accurate e.g., contains errors, omissions, duplicate data, or any similar type of error (as described above). In some embodiments, the cleansing engine 218 may utilize a threshold similarity measure to determine whether a match of the unverified entity record to be resolved exists in a first sector of a local cache memory. In some embodiments the cleansing engine 218 may utilize a hamming distance, a Euclidean distance, a Jacquard similarity, or any similar measure to determine a similarity of an unverified entity record to verified entity record in first sector a local cache memory e.g., local cache L1 228. In some embodiments the at least one cleanse engine 218 may utilize a threshold to determine whether an unverified entity record is a match to a verified entity record for example the threshold may be a match of 50%, 55%, 60%, 65%, 70%, 75%, 80%, 85%, 90%, 95%, 99.9%, or within a range of 50-99.9%. In some embodiments the at least one cleanse engine 218 determines that the unverified entity record exceeds the threshold of similarity to a verified entity record, the at least one cleanse engine 218 may store an unverified entity record in a second sector of a local cache memory e.g., local cache L1 228 and link the verified entity record in the first sector and unverified entity record in the second sector. In some embodiments the at least one cleanse engine 218 may be configured to receive at least one entity record to resolve, search for an exact match in a first sector of a local cache memory, and in the case where an exact match does not exist, search a second sector of a local cache memory based on a threshold of a similarity measure determine whether a non-exact match exists in a second sector of a local cache memory. In some embodiments, the at least one cleanse engine 218 may then determine by a link between the unverified entity record and the verified entity record to utilize the previously verified entity record, and forego entity record verification via a third party. In some embodiments the at least one cleanse engine 218 of the illustrative process module 200 may be configured to utilize a similarity measure to determine an order of unverified entity records in the second sector of the local cache memory for example, the data structure of the second sector may be a list type structure, the first entity record in the list may be the highest similarity match e.g., 95% with the verified entity record, the second entry entity record in the list may be the second highest similarity match e.g., 92%. In some embodiments the data structure of the first sector and second sector of the local cache memory is not limited to a list type but may be any type of structure such as a table, a stack, a queue, a binary search tree, a linked list, a binary tree, an array, a tree, a hash table, or any similar type of data structure or any combination thereof that efficiently encodes an entity record.

In some embodiments, the at least one cleanse engine 218 may utilize a correlation measure to determine the arrangement of unverified entity records in the data structure of the second sector of a local cache memory, such as a correlation between a vector of an unverified entity record, and a vector of a verified entity record. In some embodiments the at least one cleanse engine 218 is not limited to utilizing a correlation measure to determine arrangement of entity records in a local cache memory but may utilize any similar techniques such as sink sort, selection sort, counting sort, shell sort, tree sort, stooge sort, strand sort, insertion sort, cube sort, heap sort, timsort, merge sort, bucket sort, or any similar method or any combination thereof.

In some embodiments and as described above the first and second sector of a local cache memory of the illustrative process module 200 data structure may be a list type structure where each of a verified entity record of a first sector and an unverified entity record of a second sector is an entry of a list, and each entity record that shares a match is linked. In some embodiments the link between a first sector and a second sector of a local cache memory may be a single link, a double link, a circular link, a doubly circular linked, or any similar type of data structure link capable of efficiently linking entity records in a local cache memory of the illustrative process module 200. In some embodiments, in the case where a data structure of a first sector and a second sector of a local cache memory may be a list type, the link between the first sector verified entity record and the second sector unverified entity record may be efficiently linked as a single link type as the unverified entity records in the second sector of the local cache memory may be ordered in decreasing levels of similarity, as such the cleansing engine 218 may linearly determine a similarity between a verified entity record in a first sector, and an unverified entity record in a second sector.

In some embodiments the at least one cleanse engine 218 of the illustrative process module 200 determines whether a verified entity record exists of the received candidate entity record in a first sector of a local cache memory, the at least one blocking engine 220 receives the verified and or unverified entity record e.g., candidate entity record, and retrieves a group of potentially matching entity records from a storage device 204. In some embodiments, the blocking engine 220 may include, e.g., a memory having instructions stored thereon, as well as, e.g., a buffer to load data and instructions for processing, a communication interface, a controller, among other hardware. A combination of software and hardware may then be implemented by the blocking engine 220 in conjunction with the processor(s) 202 or a processor dedicated to the blocking engine 220 to implement the instructions stored in the memory of the blocking engine 220.

In some embodiments the at least one blocking engine 220 may perform an initial rough estimate of potential entity record matches to the group of entity records stored on a storage device 204, it may utilize a heuristic search, or a fuzzy search, and/or an algorithm based on rule-based matching, a Minhash algorithm, and/or other suitable blocking technique and combinations thereof to perform this rough estimate. In some embodiments the at least one blocking engine 220 determines potential matches based on the distance of pairs of values representing data of the group of entity records that potentially match the candidate entity record. In some embodiments the at least one blocking engine 220 may for example utilize a heuristic search to compare values representing data of at least one candidate entity record to a group of potential matching entity records such as an area code of a phone number e.g., "765" or any similar type of data of an entity record. In some embodiments, a separate data structure may be produced identifying the pair such as a data structure that includes a pointer to a potential match of at least one entity record in a storage device 204 and pointer to the at least one candidate entity record.

In some embodiments, the blocking engine 220 processes the group of entity records retrieved from the storage device 204 and the at least one candidate entity record and each possible pair with a rules engine that tests every possible pairing of each candidate entity record with a potential matching entity record against a set of rules. To maintain efficiency, the performance costs of testing every possible pair can be mitigated by using simple, deterministic rules that are quickly and efficiently tested.

In some embodiments, a feature engine 222 receives the pairs of candidate entity records and the group of potentially matching entity records to generate quantitative features characterizing each pair so that an entity engine 224 may determine an existence of a match from each of the candidate entity record pairs and the potentially matching entity record pairs. In some embodiments, the feature engine 222 compares each activity in the candidate pair to an associated entity of the candidate pair to determine a quantitative representation of a similarity between, e.g., each entity record data represented by the records of the candidate pairs. For example, the feature engine 222 may compare the entity names in each entity of each candidate pair, a location (e.g., zip code) of each entity of each candidate pair, among data of the entity records and any combinations thereof.

In some embodiments, the at least one feature engine 222 of the illustrative process module 200 may generate a feature vector representative of a different type of comparison of the activity and entity of the pair. For example, it may be capable of determining a distance, such as Jaccard distance between each entity, may determine an n-gram similarity, may determine a Jaro-Winkler distance. In some embodiments, the at least one feature engine 222 may be capable of generating one or more features for each candidate pair. In some embodiments, the at least one feature engine 222 may be capable of generating a feature vector using, e.g., 2,3,4-character n-gram similarity between, e.g., each entity name, each zip code, or other similar data item from the candidate entity record and the potentially matching entity record pairs.

In some embodiments the at least one entity engine 224 of the illustrative process module 200 may be configured as a machine learning model capable of processing feature vectors of the pairs of the at least one candidate entity record, and the potentially matching entity record pairs. The at least one entity engine 224 may be based on a deep learning natural language processing architecture having at least one input layer, at least one hidden layer, and at least one output layer. The at least one entity engine 224 processing the feature vector pairs as inputs, numerically optimizing the connections and weights of the at least one hidden layer to derive an output layer representing embeddings of feature vectors of the input of the pairs of the at least one candidate entity record and the pairs of potential matching entity records. The at least one entity engine 224 is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments the at least one entity engine 224 of the illustrative process module 200 may be configured to map clusters based on the pairs of the at least one candidate entity record, and the potentially matching entity record feature vectors, each cluster representing a candidate entity record and the associated potentially matching entity records.

In some embodiments at least one merge engine 226 of the illustrative process module 200 may determine a confidence interval of each cluster associated with the at least one candidate entity record cluster and the respective potentially matching entity records mapped by the entity engine 224 in order to determine a merge of the entity records. In some embodiments the confidence interval may be determined by employing a method of moments where the quantity to be estimated is the population mean of each cluster of the entity records associated with a candidate entity record, in which case one estimate is the sample mean. The sample variance of each respective cluster may be utilized to determine a population variance, the confidence interval for the true mean of each respective cluster may be centered on the sample mean with a width which is a multiple of the square root of the sample variance. The illustrative merge engine 226 is not limited to employing a method of moments for determining a confidence interval of each respective cluster, but may employ a maximum likelihood method, a bootstrapping method, or any similar method that may yield a confidence interval. In some embodiments, the illustrative merge engine 226 may utilize the confidence interval to determine a merge within each respective cluster of the at least one candidate entity record and the potentially matching entity records. In some embodiments the at least one merge module may utilize a pre-determined confidence interval to determine a merge of the potential matching entity records within a cluster with each of the at least one candidate entity record when the potentially matching entity records are within a 99%, 95%, 90%, 85%, 80%, 75%, 70%, or within a range of 70%-99% confidence interval.

In some embodiments the merge engine 226 of the illustrative process module 200 may utilize a distance measure to determine a merge of the clusters of the at least one candidate entity record and each respective potentially matching entity records. The at least one merge engine 226 may utilize a distance measure where the distance measure is calculated between an edge and a center point of the cluster and based on the measurement determine a threshold for a set of highly similar entity records that match the at least one candidate entity record between those two points. The merge engine 226 may be configured to merge the highly similar entity records with each respective at least one candidate entity records when a threshold of significance is determined by a standard deviation of the mean of the distance measure for example within 0.01, 0.015, 0.5, 0.55, 1.0, 1.5, 2.0, 2.5, 3.0, 3.5, 4.0, 5.0, or within a range of 0.01-5.0 significance level.

In some embodiments the illustrative process module 200 may utilize the at least one processor(s) 202 to display via the output device interface 216 e.g., monitor or printer the at least one merged entity records and associated information such as, at least one candidate entity record and the potential matching entity records determined to be within a threshold of significance of a confidence interval, related statistics, and/or attributes of at least one candidate entity record and associated entity records or any combination thereof.

Figure 3:
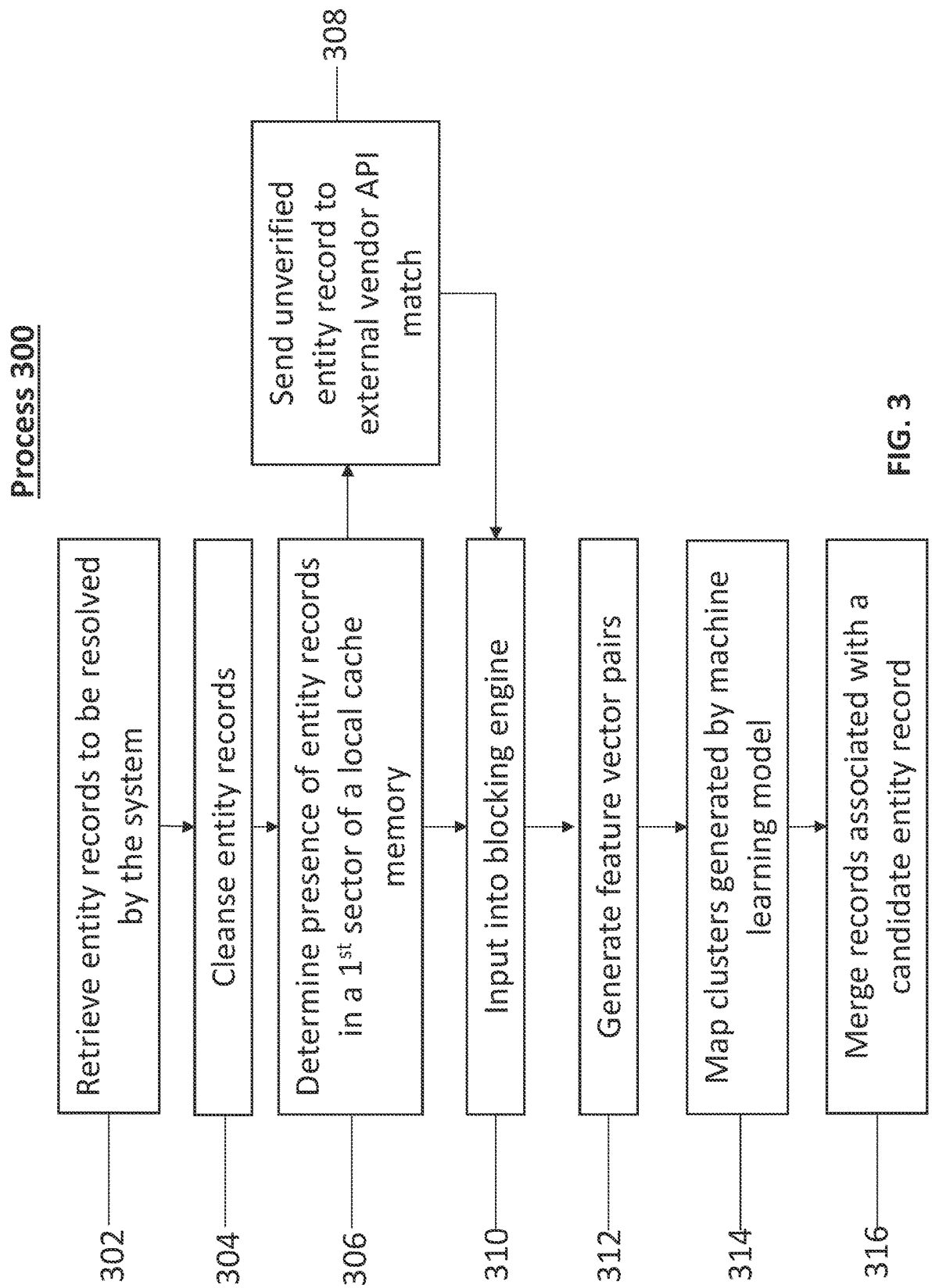
FIG. 3 is a flowchart illustrating operational steps for resolving entity records utilizing a local cache memory in accordance with one or more embodiments of the present disclosure.

FIG. 3 depicts a flowchart illustrating operational steps of the exemplary computer-implemented system configured for processing entity records in accordance with one or more embodiments of the present disclosure.

In some embodiments at Step 302 of process 300 the illustrative process module 200 may be configured to receive a group of entity records for entity resolution from a storage device 204. For example, in some embodiments, the instance module 200 may access entity records representative of one or more commercial entities, such as stores, corporations, merchants, service providers, among others or any combination thereof. The entity records for the commercial entities may include data items representative of details associated with the commercial entities. For example, the data items may be representative of, e.g., a business's legal name, an address of a store, headquarters or other place of business, a telephone number, a contact person, a merchant category code, among others or any combination thereof. Other entity records in other contexts may be employed so as to more efficiently search records, e.g., for deduplication, reconciliation, user search, among other database management tasks or any combination thereof. Indeed, the principles detailed herein are not limited to data records pertaining to entities, but rather may include data records representing one or more of any number of subjects, such as transaction records, electronic messages (e.g., emails, internet messaging or chat messages, SMS and/or MMS messages, among others or any combination thereof), or any other data records or any combination thereof.

In some embodiments the group of entity records may be stored in an elastic search environment and may be in communication with a local cache memory of the illustrative process module such as a local cache L1 228, local cache L2 230, local cache L3 232. In some embodiments the group of entity records may include at least one data item that is associated with at least one candidate entity record that is to be resolved. The local caches 228, 230, 232 provide local, efficient access data storage of data typically needed to be retrieved from another database or a third-party service or both. Thus, the process 300 may enable externally sourced data to be merged into existing data records for future efficient access.

In some embodiments at Step 304 the illustrative process module 200 may be configured with a cleanse engine 218 to cleanse a candidate entity record and the group of entity records received from the at least one storage device 204. In some embodiments the at least one cleanse engine 218 may utilize a rule-based detection to, e.g., detect the records associated with known entities are correct. Additionally, at Step 304 the at least one cleanse engine 218 removes anomalous and unnecessary information to provide a uniform format of the data of each record e.g., pad or remove portions of an entity record in order to prepare the entity records for resolution, and further to prepare to be compared with a matching verified entity record stored in a local cache memory such as local cache L1 228, local cache L2 230, local cache L3 232 of the illustrative process module 200. In some embodiments the at least one cleanse engine 218 may deduplicate entity records that are determined to exactly match among the group of entity records. In some embodiments the at least one cleanse engine 218 may utilize a search e.g., heuristic search to determine exact matches among a group of entity records.

In some embodiments at Step 306 the at least one cleanse engine 218 determines the presence of a matching entity record in a local cache memory of the illustrative process module 200. In some embodiments the illustrative process module 200 may be configured with a local cache memory such as for example local cache L1 228, local cache L2 230, local cache L3 232, and/or system memory (RAM) 206 or DRAM. In some embodiments the local cache memory local cache L1 228 may be configured with a first and second sector and may be configured to store at least one verified entity records. In some embodiments, the cleanse engine 218 receives a group of entity records associated with at least one candidate entity records from a storage device 204. In some embodiments the cleanse engine 218 may be configured to utilize a heuristic search of a first sector of a local cache L1 228 to determine if an exact match of the at least one candidate entity record is present among the verified entity records, such as, e.g., an exact match between attributes such as a business's legal name, an address of a store, headquarters or other place of business, a telephone number, a contact person, a merchant category code, among others or any combination thereof. In some embodiments upon determining the presence of an exact match of the candidate entity record in a first sector of local cache L1 228, the illustrative process module 200 will further process the candidate entity record without utilizing a third party e.g., external vendor API to verify the candidate entity record, including to retrieve additional data and/or verify the accuracy and/or contemporaneousness of the data, including, e.g., a business's legal name, an address of a store, headquarters or other place of business, a telephone number, a contact person, a merchant category code, among others or any combination thereof. In some embodiments the cleanse engine 218 may be configured to store in a second sector the at least one candidate entity records and link the candidate entity record to a verified entity record in a first sector of a local cache memory.

In some embodiments at Step 308 the at least one cleanse engine 218 may be configured to send the unverified candidate entity record to a third party for verification e.g., external vendor API. In some embodiments upon verification by a third party the cleanse engine 218 may be configured to store in a first sector of a local cache memory, such as for example in a local cache L1 228 of the illustrative process module 200.

In some embodiments at Step 310 the at least one blocking engine 220 of the illustrative process module 200 receives one of the verified candidate entity records, and the group of potential matches of entity records to be resolved by the illustrative process module 200. In some embodiments at Step 310 the at least one blocking engine 220 may be configured to perform a rough estimate of potential entity record matches to the group of entity records stored on a storage device 204, it may utilize a heuristic search, or other suitable blocking technique and combinations thereof to perform this rough estimate. In some embodiments the at least one blocking engine 220 determines potential matches based on the distance of pairs of values representing data of the group of entity records that potentially match the candidate entity record. In some embodiments the at least one blocking engine is configured to prepare a candidate entity record and a group of potentially matching entity records to be processed by at least one feature engine 222.

In some embodiments at Step 312 the at least one feature engine 222 of the illustrative process module 200 may be configured to determine feature vector pairs of the at least one candidate entity record and the associated group of matching entity records. The feature engine 222 may be configured to determine feature vectors by utilizing a data item of the entity record for example a zip code, a portion of a zip code, an area code of a telephone number, a trigram of a portion of text of a data item of an entity record, or any similar data item related to an entity record.

In some embodiments at Step 314 at least one entity engine 224 of the illustrative process module 200 is configured to map clusters of pairs of the at least one candidate entity record and the group of matching entity records. In some embodiments the at least one entity engine 224 may be based on a deep machine learning algorithm architecture and may include at least one input layer, at least one hidden layer, and at least one output layer. The at least one entity engine 224 processing as input, the pairs of feature vectors of the candidate entity record and the group of matching entity records. The at least one entity engine 224 processing by numerically optimizing the weights and connections of the at least one hidden layer to derive an output layer representing embeddings of feature vectors of the input of the candidate entity record and the group of entity records. The at least one entity engine 224 may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments at Step 316 at least one merge engine 226 of the illustrative process module 200 may be configured to merge based on a threshold distance the cluster of entity records with the matching candidate entity records determined by the entity engine 224. In some embodiments the merge engine 226 may utilize a threshold distance measure from the center of a cluster to the edge of a cluster to determine a merge of entity records. In some embodiments the merge engine 226 may utilize a similarity measure such as a hamming distance, Euclidean distance or other similar measure to determine a merge of entity records.

Figure 4:
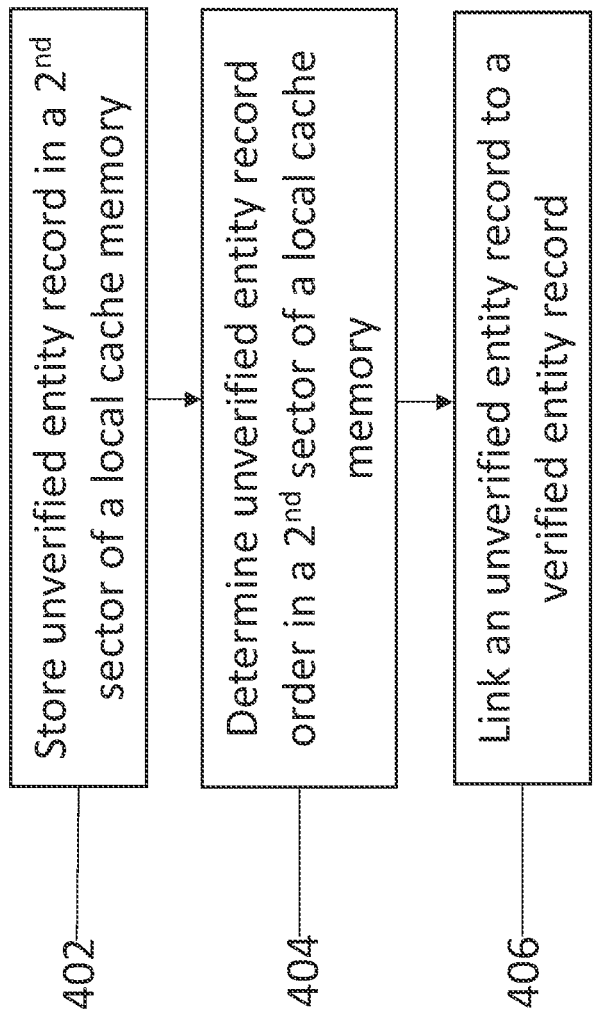
FIG. 4 is a flowchart illustrating operational steps for resolving entity records utilizing a local cache memory in accordance with one or more embodiments of the present disclosure.

FIG. 4 is a flowchart illustrating operational steps of the exemplary computer-implemented system configured for processing entity records in accordance with one or more embodiments of the present disclosure.

In some embodiments at Step 402 of process 400 at least one cleanse engine 218 of the illustrative process module 200 may be configured to store an unverified entity record in a second sector of a local cache memory. In some embodiments the unverified entity records may be utilized to identify a match with a verified entity record, for example an address of a verified entity record may be "1156 Bryant Lane", and an unverified entity record may be "1156 Bryant Ln.". Both of the entity record addresses may be the same address and, in some embodiments, the illustrative process module may receive a version of the unverified entity record to be resolved multiple times. In some embodiments the slightly mismatched unverified entity record may be stored in a second sector of a local cache memory e.g., local cache L1 228 and linked to the matching verified entity record in a first sector of a local cache memory for fast lookup or matching.

In some embodiments at Step 404 the at least one cleanse engine 218 may determine an unverified entity record order in a second sector of a local cache memory e.g., local cache L1 228 of the illustrative process module 200. In some embodiments the at least one cleanse engine 218 may utilize a threshold to determine whether an unverified entity record is a match to a verified entity record for example the threshold may be a match of 50%, 55%, 60%, 65%, 70%, 75%, 80%, 85%, 90%, 95%, 99.9%, or within a range of 50-99.9%. In some embodiments the illustrative process module 200 may utilize any type of measure to determine a match such as a hamming distance, a Euclidean distance, a Jacquard similarity or any similar type of measure or any combination thereof.

In some embodiments at Step 406 the at least one cleanse engine 218 of the illustrative process module 200 may determine a link between an unverified entity record stored in a second sector and a verified entity record stored in a first sector in a local cache memory e.g., local cache L1 218, local cache L2 220, local cache L3 222. In some embodiments the link may be a single link, a double link, a circular link, a doubly circular linked, or any similar type of data structure link capable efficiently linking entity record data structures in a local cache memory. In one or more examples, the link may represent a commonality of data representing the associated entity, such as, e.g., a business's legal name, an address of a store, headquarters or other place of business, a telephone number, a contact person, a merchant category code, among others or any combination thereof.

Figure 5:
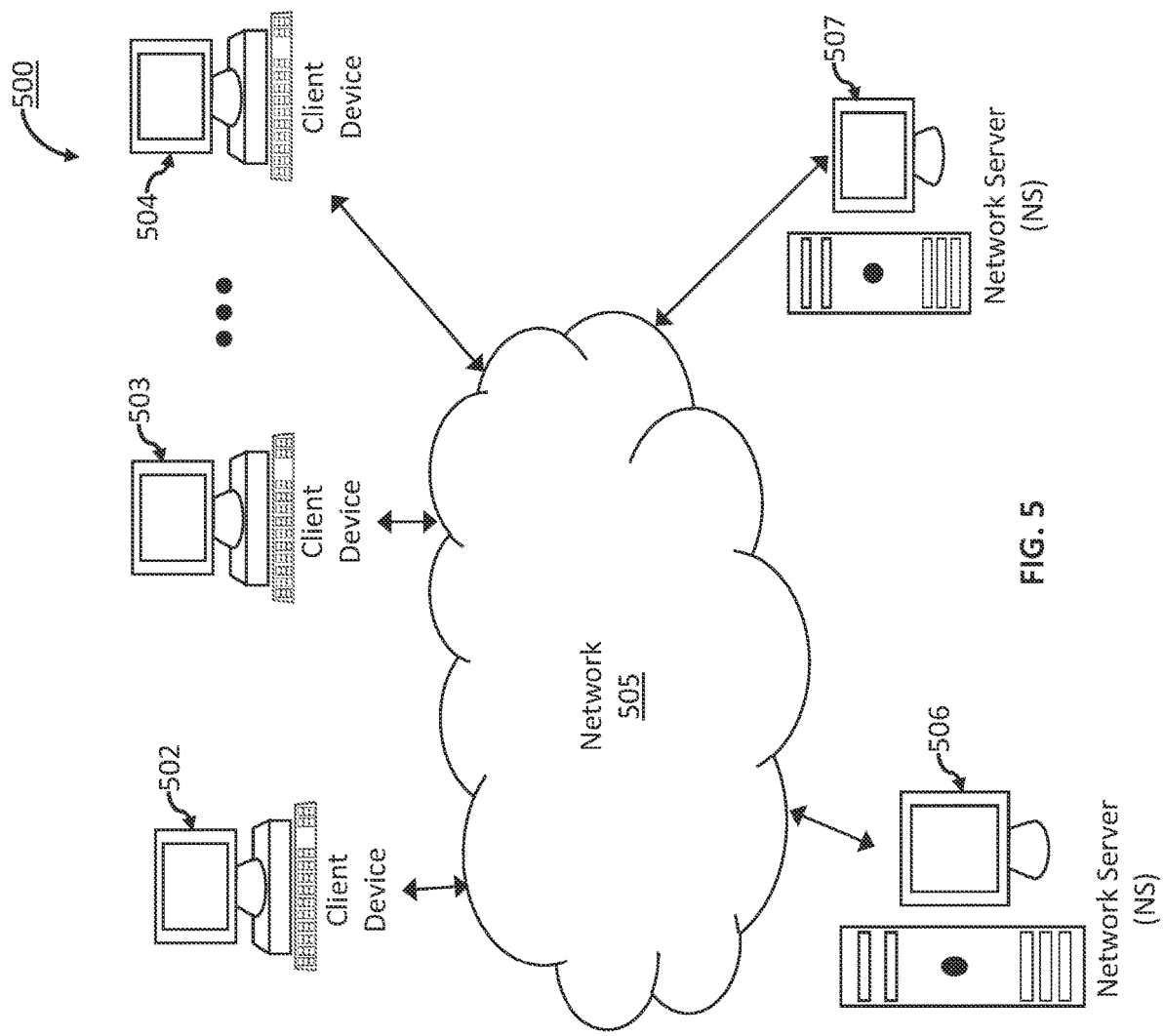
FIG. 5 depicts a block diagram of an exemplary computer-implemented system and platform 500 utilizing a local cache memory in accordance with one or more embodiments of the present disclosure.

FIG. 5 depicts a block diagram of an exemplary computer-implemented system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-implemented system and platform 500 may be configured to manage a large number of members and concurrent transactions, as detailed herein. In some embodiments, the exemplary computer-implemented system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-implemented system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 502 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

At least some aspects of the present disclosure will now be described with reference to the following numbered clauses.

Clause 1. A computer-implemented method including: receiving, by at least one processor, a group of entity records, the group of entity records stored in an elastic search environment that is in communication with at least one local cache memory, the group of entity records including at least one data item associated with an entity, the group of entity records associated with at least one candidate entity record; utilizing, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one unverified candidate entity record in a second sector of a local cache memory and link to a verified entity record of a first sector based on a distance measure; and display the at least one merged entity record.

Clause 2. The computer-implemented method of clause 1, where the processing cluster stores an unverified candidate entity record in a second sector of a local cache memory when an unverified candidate entity record matches at least 50% of a verified entity record stored in a first sector of a local cache memory.

Clause 3. The computer-implemented method of clause 2, where a data type of an entry of a first sector and a second sector of a local cache memory is a list, and an order of entries of the second sector stored based on a similarity measure.

Clause 4. The computer-implemented method of clause 2, where a data type of an entry of a first sector and a second sector of a local cache memory is a vector, and an order of entries of the second sector stored based on a similarity measure.

Clause 5. The computer-implemented method of clause 2, where a data type of an entry of a first sector and a second sector of a local cache memory is a minhash, and an order of entries of the second sector stored based on a similarity measure.

Clause 6. The computer-implemented method of any one of clauses 2 to 5, where a data type of a first sector and a second sector of a local cache memory is a vector, and the link between a local cache of a first sector and a second sector is a tree type.

Clause 7. At least one non-transient computer-readable storage medium having encoded thereon software instructions that, when executed by at least one processor, cause the at least one processor to perform the steps to: receive, by at least one processor, a group of entity records, the group of entity records stored in an elastic search environment that is in communication with at least one local cache memory, the group of entity records including at least one data item associated with an entity, the group of entity records associated with at least one candidate entity record; utilize, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one unverified candidate entity record in a second sector of a local cache memory and link to a verified entity record of a first sector based on a distance measure; and display the at least one merged entity record.

Clause 8. The at least one non-transient computer-readable storage medium of clause 7, where the processing cluster stores an unverified candidate entity record in a second sector of a local cache memory when an unverified candidate entity record matches at least 50% of a verified entity record stored in a first sector of a local cache memory.

Clause 9. The at least one non-transient computer-readable storage medium of clause 8, where a data type of an entry of a first sector and a second sector of a local cache memory is a list, and an order of entries of the second sector stored based on a similarity measure.

Clause 10. The at least one non-transient computer-readable storage medium of clause 8, where a data type of an entry of a first sector and a second sector of a local cache memory is a vector, and an order of entries of the second sector stored based on a similarity measure.

Clause 11. The at least one non-transient computer-readable storage medium of clause 8, where a data type of an entry of a first sector and a second sector of a local cache memory is a minhash, and an order of entries of the second sector stored based on a similarity measure.

Clause 12. The at least one non-transient computer-readable storage medium of any one of clauses 8 to 11, where a data structure of a first sector and a second sector of a local cache memory is a vector, and the link between a local cache of a first sector and a second sector is a tree type.

Clause 13. A system including: a non-transient computer memory, storing software instructions; and at least one processor of a first computing devices associated with a user; where, then at least one processor executes the software instructions, the first computing device is programmed to: receive, by at least one processor, a group of entity records, the group of entity records stored in an elastic search environment that is in communication with at least one local cache memory, the group of entity records including at least one data item associated with an entity, the group of entity records associated with at least one candidate entity record; utilize, by the at least one processor, a computer-implemented real-time processing cluster to determine, in the at least one local cache memory, at least one matching entity record from among the group of entity records that matches to the at least one candidate entity record; where the at least one local cache memory includes a first sector and a second sector; where the first sector of the at least one local cache memory stores a group of verified entity records; where the computer-implemented real-time processing cluster is configured to: utilize a cleansing engine to cleanse the at least one candidate entity record to form at least one cleansed candidate entity record when the at least one candidate entity record does not match a verified entity record from the group of verified entity records stored in the first sector of the at least one local cache memory; input, into a blocking engine, the at least one cleansed candidate entity record to determine a group of matching entity records from the group of entity records associated with the at least one candidate entity record; utilize a feature engine to generate candidate entity record feature vector pairs from the at least one candidate entity record and the group of matching candidate entity records; utilize at least one machine learning engine to map the group of clusters of the group of matching candidate entity records based on the candidate entity record feature vector pairs; merge, based on a threshold distance from the at least one candidate entity record, at least one first set of the matching candidate entity records of the at least one first cluster of the group of clusters with at least one second set of matching candidate entity record of at least one second cluster of the group of clusters; store at least one pre-cleansed candidate entity record in a second sector of a local cache memory and link to a verified entity record of a first sector based on a distance measure; and display the at least one merged entity record.

Clause 14. The system of clause 13, where the processing cluster stores an unverified candidate entity record in a second sector of a local cache memory when an unverified candidate entity record matches at least 50% of a verified entity record stored in a first sector of a local cache memory.

Clause 15. The system of clause 14, where a data structure of an entry of a first sector and a second sector of a local cache memory is a list, and an order of entries of the second sector stored based on a similarity measure.

Clause 16. The system of clause 14, where a data type of an entry of a first sector and a second sector of a local cache memory is a vector, and an order of entries of the second sector stored based on a similarity measure.

Clause 17. The system of clause 14, where a data type of an entry of a first sector and a second sector of a local cache memory is a minhash, and an order of entries of the second sector stored based on a similarity measure.

Clause 18. The system of any one of clauses 15 to 17, where a data type of a first sector and a second sector of a local cache memory is a vector, and the link between a local cache of a first sector and a second sector is a tree type.

Clause 19. The system of any one of clauses 15 to 17, where a data type of a first sector and a second sector of a local cache memory is a vector, and the link between a local cache of a first sector and a second sector is a linked list type.

Clause 20. The system of any one of clauses 15 to 17, where a data type of a first sector and a second sector of a local cache memory is a vector, and the link between a local cache of a first sector and a second sector is an expression trees type.

In some embodiments, the illustrative computer-implemented systems of the present disclosure may be configured to utilize one or more illustrative AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an illustrative neutral network technique may be one of, without limitation, feedforward neural network, radial basis function network, recurrent neural network, convolutional network (e.g., U-net) or other suitable network. In some embodiments and, optionally, in combination of any embodiment described above or below, an illustrative implementation of Neural Network may be executed as follows:
 i) Define Neural Network architecture/model,
 ii) Transfer the input data to the illustrative neural network model,
 iii) Train the illustrative model incrementally,
 iv) determine the accuracy for a specific number of timesteps,
 v) apply the illustrative trained model to process the newly-received input data,
 vi) optionally and in parallel, continue to train the illustrative trained model with a predetermined periodicity.

In some embodiments and, optionally, in combination of any embodiment described above or below, the illustrative trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the illustrative trained neural network model may also be specified to include other parameters, including but not limited to, bias values, bias functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the illustrative aggregation function may be a mathematical function that combines (e.g., sum, product, etc.) input signals to the node. In some embodiments and, optionally, in combination of any embodiment described above or below, an output of the illustrative aggregation function may be used as input to the illustrative activation function. In some embodiments and, optionally, in combination of any embodiment described above or below, the bias may be a constant value or function that may be used by the aggregation function or the activation function, or both, to make the node more or less likely to be activated.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events or actions can be triggered or occur without any human intervention. In some embodiments, events or actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, illustrative, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more of illustrative computer-implemented systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of illustrative computer-implemented systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more of illustrative computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23)

Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, illustrative software specifically programmed in accordance with one or more principles of the present disclosure may be downloadable from a network, for example, a website, as a stand-alone product or as an add-in package for installation in an existing software application. For example, illustrative software specifically programmed in accordance with one or more principles of the present disclosure may also be available as a client-server software application, or as a web-enabled software application. For example, illustrative software specifically programmed in accordance with one or more principles of the present disclosure may also be embodied as a software package installed on a hardware device.

In some embodiments, illustrative computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems of the present disclosure may be configured to output to distinct, specifically programmed graphical user interface implementations of the present disclosure (e.g., a desktop, a web app., etc). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device or system of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems of the present disclosure may be configured to securely store or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The aforementioned examples are, of course, illustrative and not restrictive.

The invention claimed is:

1. A computer-implemented method comprising:
   receiving, by at least one processor, a plurality of entity records, the plurality of entity records stored in an elastic search environment that is in communication with at least one local cache memory, the plurality of entity records comprising at least one data item associated with an entity, the plurality of entity records associated with at least one candidate entity record;
   utilizing, by the at least one processor, a computer-implemented real-time processing cluster to determine, in the at least one local cache memory, at least one matching entity record from among the plurality of entity records that matches to the at least one candidate entity record;
   wherein the at least one local cache memory comprises a first sector and a second sector;
   wherein the first sector of the at least one local cache memory stores a plurality of verified entity records;
   wherein the computer-implemented real-time processing cluster is configured to:
      utilize a cleansing engine to cleanse the at least one candidate entity record to form at least one cleansed candidate entity record when the at least one candidate entity record does not match a verified entity record from the plurality of verified entity records stored in the first sector of the at least one local cache memory;
      input, into a blocking engine, the at least one cleansed candidate entity record to determine a plurality of matching candidate entity records from the plurality of entity records associated with the at least one candidate entity record;
      utilize a feature engine to generate candidate entity record feature vector pairs from the at least one candidate entity record and the plurality of matching candidate entity records;
      utilize at least one machine learning engine to map the plurality of clusters of the plurality of matching candidate entity records based on the candidate entity record feature vector pairs;
      merge, based on a threshold distance from the at least one candidate entity record, at least one first set of the plurality of matching candidate entity records of at least one first cluster of the plurality of clusters with at least one second set of the plurality of matching candidate entity records of at least one second cluster of the plurality of clusters;
      store at least one unverified candidate entity record in the second sector of the at least one local cache memory and link to a verified entity record of the first sector based on a distance measure;
         wherein the linking of unverified candidate entity records in the second sector to verified entity records in the first sector enables to resolve subsequent entity record queries without requiring external network calls to third-party verification services; and
      display the at least one merged entity record.

2. The computer-implemented method of claim 1, wherein the processing cluster stores an unverified candidate entity record in the second sector of the at least one local cache memory when an unverified candidate entity record matches at least 50% of a verified entity record stored in the first sector of the at least one local cache memory.

3. The computer-implemented method of claim 2, wherein a data type of an entry of the first sector and the second sector of the at least one local cache memory is a list, and an order of entries of the second sector stored based on a similarity measure.

4. The computer-implemented method of claim 2, wherein a data type of an entry of the first sector and the second sector of the at least one local cache memory is a vector, and an order of entries of the second sector stored based on a similarity measure.

5. The computer-implemented method of claim 2, wherein a data type of an entry of the first sector and the second sector of the at least one local cache memory is a minhash, and an order of entries of the second sector stored based on a similarity measure.

6. The computer-implemented method of claim 1, wherein a data type of the first sector and the second sector of the at least one local cache memory is a vector, and the link between a local cache of the first sector and the second sector is a tree type.

7. At least one non-transient computer-readable storage medium having encoded thereon software instructions that, when executed by at least one processor, cause the at least one processor to perform steps to:
   receive, by at least one processor, a plurality of entity records, the plurality of entity records stored in an elastic search environment that is in communication with at least one local cache memory, the plurality of entity records comprising at least one data item associated with an entity, the plurality of entity records associated with at least one candidate entity record;
   utilize, by the at least one processor, a computer-implemented real-time processing cluster to determine, in the at least one local cache memory, at least one matching entity record from among the plurality of entity records that matches to the at least one candidate entity record;
   wherein the at least one local cache memory comprises a first sector and a second sector;
   wherein the first sector of the at least one local cache memory stores a plurality of verified entity records;
   wherein the computer-implemented real-time processing cluster is configured to:
   utilize a cleansing engine to cleanse the at least one candidate entity record to form at least one cleansed candidate entity record when the at least one candidate entity record does not match a verified entity record from the plurality of verified entity records stored in the first sector of the at least one local cache memory;

input, into a blocking engine, the at least one cleansed candidate entity record to determine a plurality of matching candidate entity records from the plurality of entity records associated with the at least one candidate entity record;

utilize a feature engine to generate candidate entity record feature vector pairs from the at least one candidate entity record and the plurality of matching candidate entity records;

utilize at least one machine learning engine to map the plurality of clusters of the plurality of matching candidate entity records based on the candidate entity record feature vector pairs;

merge, based on a threshold distance from the at least one candidate entity record, at least one first set of the plurality of matching candidate entity records of the at least one first cluster of the plurality of clusters with at least one second set of the plurality of matching candidate entity records of at least one second cluster of the plurality of clusters;

store at least one unverified candidate entity record in the second sector of the at least one local cache memory and link to a verified entity record of the first sector based on a distance measure;

wherein the linking of unverified candidate entity records in the second sector to verified entity records in the first sector enables to resolve subsequent entity record queries without requiring external network calls to third-party verification services; and display the at least one merged entity record.

8. The at least one non-transient computer-readable storage medium of claim 7, wherein the processing cluster stores an unverified candidate entity record in the second sector of the at least one local cache memory when an unverified candidate entity record matches at least 50% of a verified entity record stored in the first sector of the at least one local cache memory.

9. The at least one non-transient computer-readable storage medium of claim 8, wherein a data type of an entry of the first sector and the second sector of the at least one local cache memory is a list, and an order of entries of the second sector stored based on a similarity measure.

10. The at least one non-transient computer-readable storage medium of claim 8, wherein a data type of an entry of the first sector and the second sector of the at least one local cache memory is a vector, and an order of entries of the second sector stored based on a similarity measure.

11. The at least one non-transient computer-readable storage medium of claim 8, wherein a data type of an entry of the first sector and the second sector of the at least one local cache memory is a minhash, and an order of entries of the second sector stored based on a similarity measure.

12. The at least one non-transient computer-readable storage medium of claim 8, wherein a data structure of the first sector and the second sector of the at least one local cache memory is a vector, and the link between a local cache of the first sector and the second sector is a tree type.

13. A system comprising:

a non-transient computer memory, storing software instructions; and at least one processor of a first computing device associated with a user;

wherein, when at least one processor executes the software instructions, the first computing device is programmed to:

receive a plurality of entity records, the plurality of entity records being stored in an elastic search environment, the elastic search environment being in communication with at least one local cache memory, each entity record comprising at least one data item associated with a particular entity, the plurality of entity records associated with at least one candidate entity record;

utilizing, by the at least one processor, a computer-implemented real-time processing cluster to determine, in the at least one local cache memory, at least one matching entity record from among the plurality of entity records that matches to the at least one candidate entity record;

wherein the at least one local cache memory comprises a first sector and a second sector;

wherein the first sector of the at least one local cache memory stores a plurality of verified entity records;

wherein the computer-implemented real-time processing cluster is configured to:

utilize a cleansing engine to cleanse the at least one candidate entity record to form at least one cleansed candidate entity record when the at least one candidate entity record does not match a verified entity record from the plurality of verified entity records stored in the first sector of the at least one local cache memory;

input, into a blocking engine, the at least one cleansed candidate entity record to determine a plurality of matching candidate entity records from the plurality of entity records associated with the at least one candidate entity record;

utilize a feature engine to generate candidate entity record feature vector pairs from the at least one candidate entity record and the plurality of matching candidate entity records;

utilize at least one machine learning engine to map the plurality of clusters of the plurality of matching candidate entity records based on the candidate entity record feature vector pairs;

merge, based on a threshold similarity from the at least one candidate entity record, at least one first set of the plurality of matching candidate entity records of at least one first cluster of the plurality of clusters with at least one second set of the plurality of matching candidate entity records of at least one second cluster of the plurality of clusters;

store at least one unverified candidate entity record in the second sector of the at least one local cache memory and link to a verified entity record of the first sector based on a distance measure;

wherein the linking of unverified candidate entity records in the second sector to verified entity records in the first sector enables to resolve subsequent entity record queries without requiring external network calls to third-party verification services; and display the at least one merged entity record.

14. The system of claim 13, wherein the first computing device stores an unverified candidate entity record in the second sector of the at least one local cache memory when an unverified candidate entity record matches at least 50% of a verified entity record stored in the first sector of the at least one local cache memory.

15. The system of claim 14, wherein a data structure of an entry of the first sector and the second sector of the at least one local cache memory is a list, and an order of entries of the second sector stored based on a similarity measure.

16. The system of claim 14, wherein a data type of an entry of the first sector and the second sector of the at least one local cache memory is a vector, and an order of entries of the second sector stored based on a similarity measure.

17. The system of claim 14, wherein a data type of an entry of the first sector and the second sector of the at least one local cache memory is a minhash, and an order of entries of the second sector stored based on a similarity measure.

18. The system of claim 14, wherein a data type of the first sector and the second sector of the at least one local cache memory is a vector, and a link between a local cache of the first sector and the second sector is a tree type.

19. The system of claim 14, wherein a data type of the first sector and the second sector of the at least one local cache memory is a vector, and a link between a local cache of the first sector and the second sector is a linked list type.

20. The system of claim 14, wherein a data type of the first sector and the second sector of the at least one local cache memory is a vector, and a link between a local cache of the first sector and the second sector is an expression trees type.

* * * * *